United States Patent [19]

Pu et al.

[11] 4,264,694
[45] Apr. 28, 1981

[54] PHOTOSENSITIVE MEDIUM FOR ELECTROPHOTOGRAPHY HAVING A CYANINE PHOTOCONDUCTIVE PIGMENT

[75] Inventors: Lyong S. Pu; Hitoshi Kamoda, both of Minami-ashigara, Japan

[73] Assignee: Fuji Xerox Co., Ltd., Tokyo, Japan

[21] Appl. No.: 886,011

[22] Filed: Mar. 13, 1978

[30] Foreign Application Priority Data

Mar. 11, 1977 [JP] Japan .................................. 52-25897

[51] Int. Cl.³ .............................................. G03G 5/06
[52] U.S. Cl. ....................................... 430/58; 430/78; 430/77
[58] Field of Search ....................... 430/77, 76, 78, 93, 430/58

[56] References Cited

U.S. PATENT DOCUMENTS

| | | | |
|---|---|---|---|
| 3,796,573 | 3/1974 | Jones | 96/1.6 |
| 3,852,066 | 12/1974 | Levy | 96/1.7 |
| 3,852,067 | 12/1974 | Levy | 96/1.7 |
| 3,879,197 | 4/1975 | Bartlett | 96/1.6 |
| 3,887,366 | 6/1975 | Champ et al. | 96/1.6 |
| 3,894,868 | 7/1975 | Regensburger | 96/1.5 |
| 3,958,991 | 5/1976 | Jones et al. | 96/1.6 |
| 4,040,825 | 8/1977 | Sreiger et al. | 96/1.6 |

*Primary Examiner*—Roland E. Martin, Jr.
*Assistant Examiner*—John L. Goodrow
*Attorney, Agent, or Firm*—Sughrue, Rothwell, Mion, Zinn and Macpeak

[57] ABSTRACT

A photosensitive medium for electrophotography which comprises a support having thereon a photoconductive layer comprising an organic photoconductive material and containing in a dispersed state a cyanine pigment which functions as a photoconductor expressed by the following general formula (I)

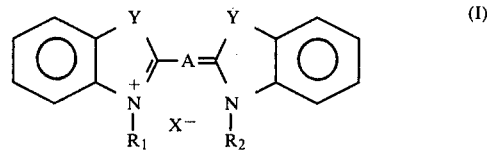

in which A represents

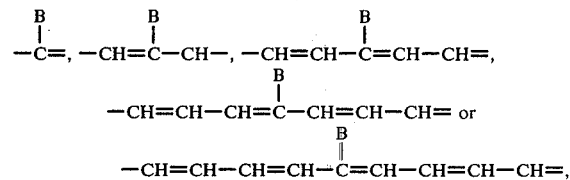

wherein B represents an aromatic group, a halogen atom, a nitro group, a cyano group, an acetoxy group, a styryl group, an alkylthio group, an alkoxy group,

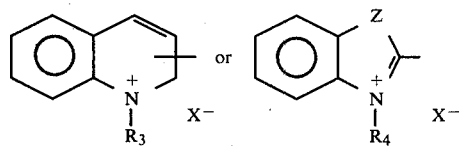

in which Z represents —O—, —Se—,

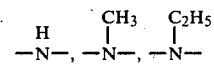

or —S—, $R_1$, $R_2$, $R_3$ and $R_4$, which may be the same or different, each represents an alkyl group or an allyl group, Y represents —S—, —Se—, —O—,

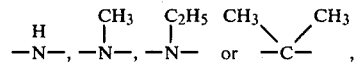

X represents an anion, and the two benzene nuclei may include a carbocylic ring condensed therewith.

8 Claims, No Drawings

PHOTOSENSITIVE MEDIUM FOR ELECTROPHOTOGRAPHY HAVING A CYANINE PHOTOCONDUCTIVE PIGMENT

BACKGROUND OF THE INVENTION

1. Field of the Invention

This invention relates to an electrophotograhic photosensitive medium useful in electrophotographic processes. More particularly, it relates to a photoconductive medium with an extremely high sensitivity which is usable in any existing electrophotographic processes and which has a wide spectral sensitivity over the wavelength range of visible light.

2. Description of the Prior Art

As is well known, amorphous selenium or selenium alloys which have very excellent electrophotographic characteristics have been widely employed as electrophotographic photosensitive media. In practical applications, selenium or selenium alloys are generally used in the form of a thin film. However, the use of selenium or selenium alloys involves several disadvantages in that the film formation essentially requires the complicated step of vacuum evaporation and in that the vacuum evaporated film formed has poor flexibility.

It is also known that zinc oxide or cadmium sulfide is also usable as an electrophotographic photosensitive material by dispersing such in a binder resin. However, the dispersed photosensitive resin layer does not withstand repeated use because of the low mechanical strength of the layer. Especially, the spectral sensitivity of zinc oxide is unsatisfactory, so that use of sensitizing dyes for spectral sensitization is essential to widen the sensitivity range of zinc oxide toward the long wavelength range.

In addition to inorganic photosensitive materials such as selenium, zinc oxide, cadmium sulfide, etc., organic photosensitive materials are widely known, of which polyvinylcarbazole and derivatives thereof are typical. Of these, polyvinylcarbazole per se has been intensively studied as is known from the abundant literature available. Although polyvinylcarbazole has excellent transparency, film-forming ability and flexibility, polyvinylcarbazole does not exhibit any sensitivity in the visible light range by itself. Accordingly, a number of methods have been proposed for sensitizing polyvinylcarbazole e.g., as disclosed in U.S. Pat. No. 3,484,237, U.S. Pat. No. 3,655,378, etc. Typical sensitization methods include spectral sensitization using dyes such as triphenylmethane dyes, pyrylium salt dyes, etc., and chemical sensitization using electron-accepting compounds of which tetranitrofluorenone is typical. In spectral sensitization, polyvinylcarbazole sensitized with dyes has a spectral sensitivity range expanded over the visible light range, but has unsatisfactory sensitivity for use as an electrophotographic photosensitive material. In addition, dye-sensitized polyvinylcarbazole has a high tendency toward light fatigue and can not thus withstand repeated use. While, in chemical sensitization, some combinations of polyvinylcarbazole and electron-accepting compounds have been found to exhibit a satisfactory sensitivity for use as an electrophotographic photosensitive material and are now employed in practice. However, photosensitive materials of the type just mentioned have several problems in terms of mechanical strength, life time, etc.

In recent years, pigment-dispersed photosensitive materials wherein photoconductive pigments are dispersed in a binder have been extensively studied and a number of reports concerning such photosensitive materials have been made as described in, for example, U.S. Pat. No. 3,887,366. However, photosensitive materials which have excellent electrical characteristics and satisfactory sensitivity suitable for electrophotographic purposes have not yet been obtained. For example, a report that phthalocyanine has excellent characteristics as a dispersion-type photosensitive material has been made. However, the spectral sensitivity of phthalocyanine is inclined towards the long wavelength region, resulting in poor fidelity for red color. Further, Japanese Patent Application (OPI) No. 99142/1975, for example, discloses that a photosensitive material obtained by dispersing an organic photoconductive compound and a spectral sensitizing agent for the compound in a binder has excellent electrical characteristics. However, the mechanical strength and life time of such a photosensitive material are unsatisfactory and must be improved.

SUMMARY OF THE INVENTION

An intensive study of the preparation of a photoconductive material which overcomes the disadvantages of known inorganic photosensitive materials, organic photosensitive materials, and dispersion-type photosensitive materials and which has excellent electrophotographic characteristics and excellent flexibility has been made.

An object of the present invention is to provide a photoconductive medium of high sensitivity which is usable in any existing electrophotographic processes and which has a spectral sensitivity over the entire wavelength range of visible light having a wavelength of about 4,000 to about 7,000 Å.

Another object of the present invention to provide an electrophotographic photosensitive medium using a photoconductive material which is much more flexible than would be expected with known inorganic photosensitive materials and which has excellent abrasion resistance and mechanical strength in comparison with polyvinylcarbazole-trinitrofluorenone organic photosensitive materials.

A further object of the present invention is to produce a photosensitive medium using a photoconductive material which has an almost flat and high level of spectral sensitivity over the entire wavelength range of visible light with excellent mechanical strength such as abrasion resistance.

The electrophotographic photosensitive medium according to the present invention comprises a photoconductive material layer which contains in a dispersed state a cyanine pigment expressed by the following general formula (I)

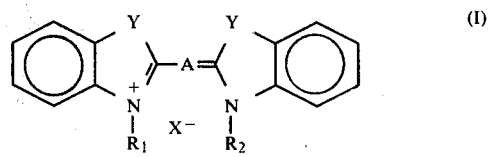

in which A represents a member selected from the group consisting of

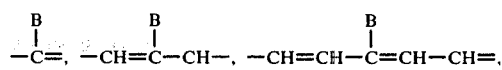

-continued

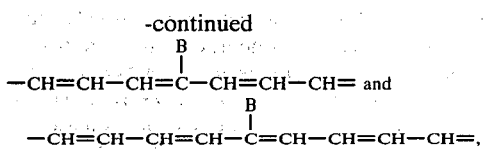

wherein B represents an aromatic group, a halogen atom (e.g., Cl, Br and I), a nitro group, a cyano group, an acetoxy group, a styryl group, an alkylthio group in which the alkyl moiety thereof has 1 to 3 carbon atoms, an alkoxy group in which the alkyl moiety thereof has 1 to 3 carbon atoms,

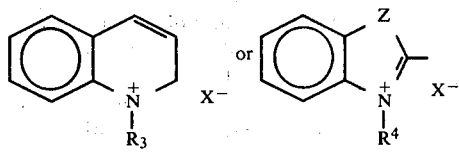

in which Z represents —O—, —Se—,

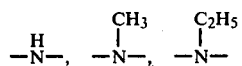

or —S—; $R_1$, $R_2$, $R_3$ and $R_4$, which may be the same or different, each is an alkyl group having 1 to 3 carbon atoms or an allyl group; Y represents a member selected from the group consisting of —S—, —Se—, —O—,

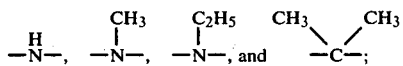

X represents an anion; and the two benzene nuclei may include a carbocyclic ring condensed therewith.

DETAILED DESCRIPTION OF THE INVENTION

In the general formula (I), B represents an unsubstituted or a substituted aromatic group and if substituted, suitable substituents include, for example, a lower alkyl group having 1 to 5 carbon atoms, a halogen atom (e.g., Cl, Br and I), a nitro group, a cyano group, a hydroxyl group, an amino group or the like. Examples of unsubstituted alkyl groups for $R_1$, $R_2$, $R_3$ and $R_4$ include —$CH_3$, —$C_2H_5$, —$C_3H_7$, —$C_4H_9$, —$C_5H_{11}$, —$C_6H_{13}$, —$C_7H_{15}$, —$C_8H_{17}$, etc., $R_1$, $R_2$, $R_3$ and $R_4$ can also be a substituted alkyl group and suitable substituents for the alkyl group include a halogen atom (e.g., Cl, Br and I), a cyano group, a hydroxyl group, a phenyl group or the like.

Examples of suitable alkylthio groups for B include a methylthio group, an ethylthio group or the like, and examples of suitable alkoxy groups for B include a methoxy group, an ethoxy group or the like. Further, examples of anions for X include, I, Br, Cl, $ClO_4$, $BF_4$, $R_5COO$—, $R_6SO_3$—, $R_7SO_4$— and $NO_3$, in which $R_5$ represents an alkyl group containing 1 to 5 carbon atoms (e.g., —$CH_3$, —$C_2H_5$, —$C_3H_7$, —$C_4H_9$, —$C_5H_{11}$, etc.), an aromatic group (e.g., phenyl, naphthyl and anthranyl) or a nitrogen-containing heterocyclic group, $R_6$ represents an alkyl group containing 1 to 4 carbon atoms (e.g., —$CH_3$, —$C_2H_5$, —$C_3H_7$, —$C_4H_9$, etc.) or an aromatic group (e.g., phenyl, naphthyl and anthranyl), and $R_7$ represents a hydrogen atom or an alkyl group (e.g., —$CH_3$, —$C_2H_5$, —$C_3H_7$, —$C_4H_9$, etc.).

If $R_5$ is a substituted aromatic group, suitable substituents include, for example, an alkyl group (e.g., —$CH_3$, —$C_2H_5$, —$C_3H_7$, etc.), a halogen atom (e.g., Cl, Br and I), a hydroxyl group, an amino group, a nitro group, a cyano group, an aldehyde group, a carboxylic acid ester group (e.g., ethyl acetate, methyl acetate, butyl acetate, etc.) or the like. A suitable carbocyclic ring condensed with the benzene nuclei can be, for example, a benzene ring.

Typical examples of cyanine pigments expressed by the above-described general formula (I) are those represented by the following structural formulae. However, the present invention is not to be construed as being limited to the specific examples shown below.

Cyanine Pigment (1)

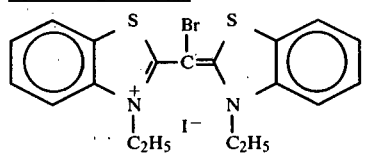

Cyanine Pigment (2)

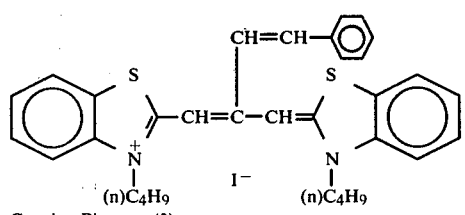

Cyanine Pigment (3)

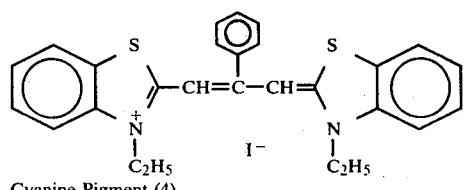

Cyanine Pigment (4)

-continued
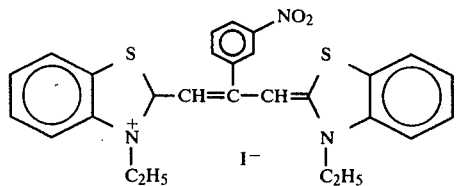
Cyanine Pigment (5)
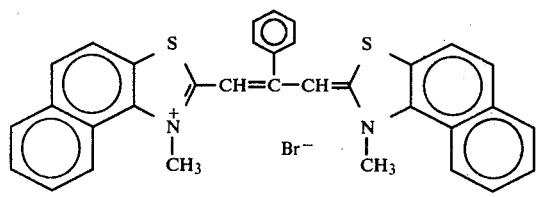
Cyanine Pigment (5′)
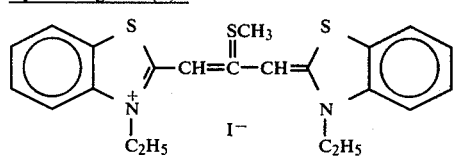
Cyanine Pigment (6)
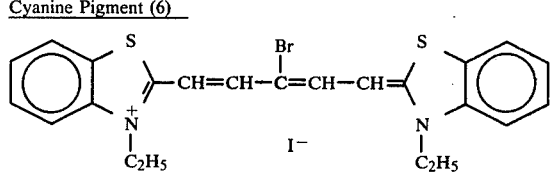
Cyanine Pigment (7)
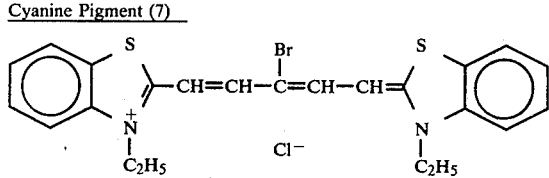
Cyanine Pigment (8)
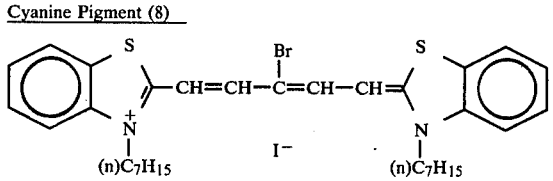
Cyanine Pigment (9)
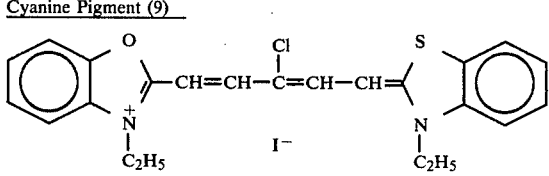
Cyanine Pigment (10)
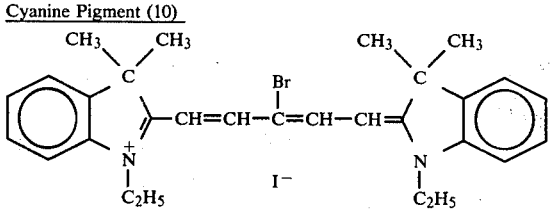
Cyanine Pigment (11)
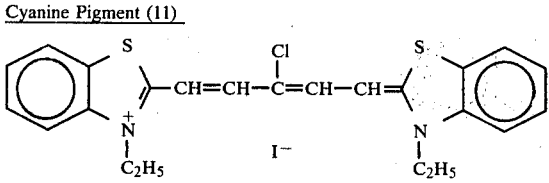
Cyanine Pigment (12)

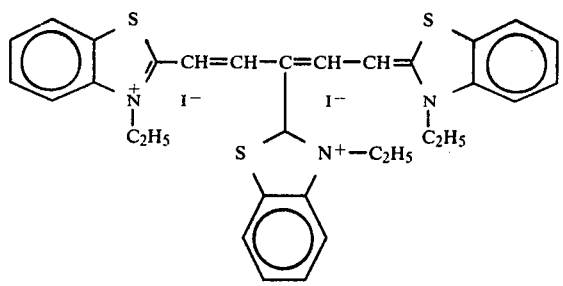
Cyanine Pigment (13)
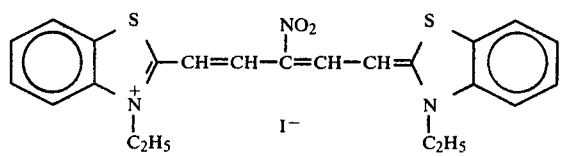
Cyanine Pigment (14)
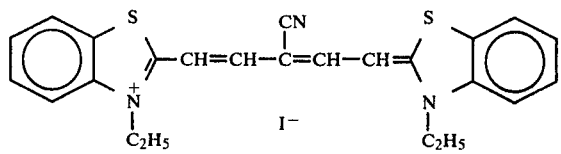
Cyanine Pigment (15)
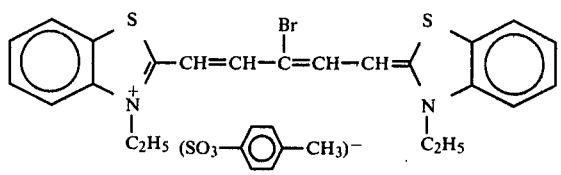
Cyanine Pigment (16)
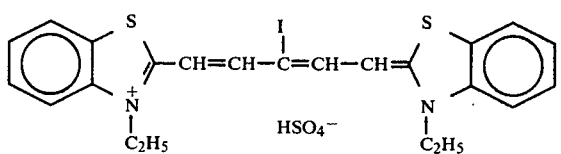
Cyanine Pigment (17)
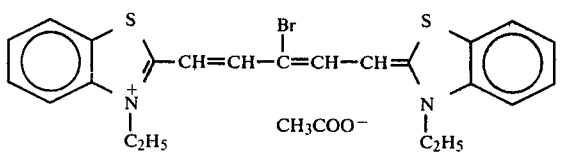
Cyanine Pigment (18)
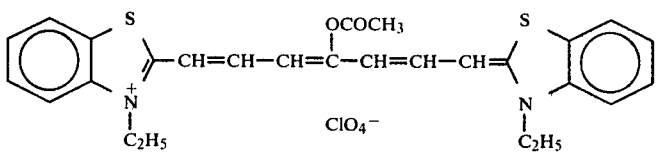
Cyanine Pigment (19)
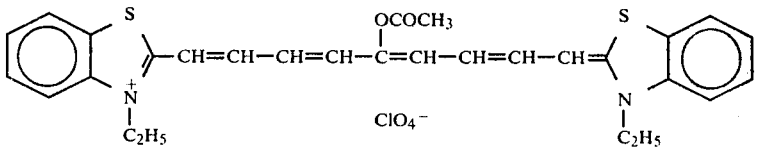
Cyanine Pigment (20)

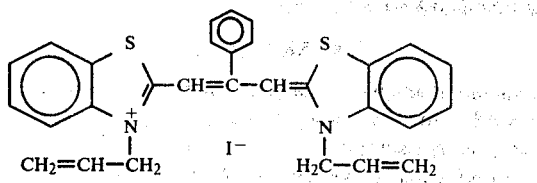

The cyanine pigment expressed by the general formula (I) may be used, according to the present invention, for an electrophotographic photosensitive medium of a photoconductive single-layer or multi-layer structure. That is, in an electrophotographic photosensitive medium of the type which comprises a photoconductive layer of a double layer structure, the double layer structure comprises a charge-generating layer and a charge-transporting layer. A suitable film thickness of the photoconductive layer when a single layer embodiment is used can be about 3 to about 100μ, preferably 5 to 50μ, and, when a double layer embodiment is used and the photoconductive layer is the charge-generating layer, is about 0.05 to about 3μ. Addition of the cyanine pigment to both the charge-generating layer and the charge-transporting layer such as of polyvinylcarbazole is effective in improving the chargeability of the photosensitive medium, reducing the residual potential and also improving the mechanical strength.

In the practice of the present invention, the cyanine pigment of the general formula (I) is dispersed in a binder. Upon dispersion, the pigment particles must not be of a size on the order of the magnitude of a molecule or of a similar size. The pigment particle size preferably is less than about 5μ, preferably less than 1μ. Prior to the dispersion, the pigment is finely powdered. The powdering can be achieved by known methods using a SPEX MILL, a Ball Mill Red Devil (trade name), etc. The pigment which has been powdered to a size below about 5μ, preferably below 1μ, as described above, exhibits good electrophotographic characteristics. On the other hand, when the pigment is pulverized to a size on the order of the magnitude of a molecule, the electrophotographic characteristics are undesirably reduced. Pigment particles of a size below about 5μ are dispersed in binder in an amount of about 5 to about 90 wt.%, preferably 10 to 60 wt.%.

The binder may be photoconductive or non-photoconductive. Examples of suitable photoconductive binders (charge-transporting matrix) include photoconductive polymers such as polyvinylcarbazole, polyvinylcarbazole derivatives, polyvinylnaphthalene, polyvinylanthracene, polyvinylpyrene, etc., and other organic matrix materials having a charge-transporting ability such as TNF (trinitrofluorene), N-ethylcarbazole, anthracene, etc. Known dye sensitizers can be added to the photoconductive binder. Usable dye sensitizers are, for example, triphenylmethane dyes such as Crystal Violet, Malachite Green, Brilliant Green, etc., xanthene dyes such as Rhodamine B, Rhodamine 6G, etc., and thiazine dyes such as Methylene Blue, New Methylene Blue, etc. Likewise, chemical sensitizers may be used, including electron-accepting materials such as trinitrofluorenone, tetranitrofluorenone, dinitrodibenzothiophenedioxide, picric acid, etc. Dye sensitizers and chemical sensitizers may be used in combination without any disadvantages arising. A suitable amount of the dye sensitizers which can be used is about 0.1 to about 1% by weight based on the weight of the binder resin, and a suitable amount of the chemical sensitizers which can be used is about 0.1 to about 1.5 mol per mol of the monomer of the polymer.

As described hereinbefore, known non-photoconductive electrically insulating resins can also be used as a binder. Examples of such resins include polystyrene, polyesters, polyvinyltoluene, polyvinylanisole, polyfluorostyrene, polyvinyl butyral, polyvinyl acetal, polyvinyl butylmethacrylate, styrene-butadiene copolymers, polysulfones, styrenemethylmethacrylate copolymers, polycarbonates, etc.

In order to improve the mechanical strength of the photoconductive layer, plasticizers may be added to the binder-pigment mixture as well as conventional polymeric materials. Usable plasticizers include chlorinated paraffin, chlorinated biphenyl, phosphate plasticizers, phthalate plasticizers, etc. A suitable amount of the plasticizer ranges from about 0 to about 60% by weight of the binder. By addition of a plasticizer, the mechanical strength of the photosensitive medium may be improved without reduction of the electrical characteristics.

The binder having the cyanine pigment dispersed therein is coated onto an electrically conductive support using any known methods such as an immersion method, a spray method, a bar-coating method, an applicator method, etc. Any of the above methods ensure formation of a good photosensitive layer. The electrically conductive support may be any of metal plates, paper sheets rendered electrically conductive, polymer films, Nesa glass, etc.

The present invention is more specifically illustrated by reference to the following examples. Unless otherwise indicated, all parts, percents, ratios and the like are by weight.

EXAMPLE 1

Cyanine Pigment (6) having a particle size of 0.5μ was placed in a ball mill together with tetrahydrofuran (THF) in an amount of 10 g per gram of pigment and ball-milled for 48 hours. After completion of the ball-milling, 20% by weight of the pigment was added to and mixed with a binder, Du Pont Mylar 49000 (trade name for a saturated polyester), dissolved in THF. The resulting mixture was applied onto a Al plate by means of an applicator (in a wet thickness of 150μ) and dried at 70° C. for 60 min. The film thickness obtained after the drying was found to be about 10μ. The thus obtained photosensitive medium was tested using an Electro Static Paper Analyzer manufactured by Kawaguchi Denki K. K., and the half value exposure in positive charging was found to be 8 lux. sec.

EXAMPLE 2

Cyanine Pigment (7) having a particle size of 0.3μ was placed in a test tube in which steel balls and THF were further added for pulverizing for 24 hours. Then, a photosensitive medium was prepared in the same manner as described in Example 1, and the electrical characteristics were measured. As a result, it was found that the half value exposure in positive charging was 10 lux. sec.

EXAMPLES 3-11

The procedures of Example 1 were repeated using Cyanine Pigments (2)-(5) and (8)-(12) thereby obtaining nine kinds of photosensitive media, respectively. The electrical characteristics of each of the photosensitive media were measured with the results shown in Table 1 below being obtained.

TABLE 1

| Cyanine Pigment | $V_0^+$ (volts) | $E_{\frac{1}{2}}^+$ (lux.sec.) | $V_0^-$ (volts) | $E_{\frac{1}{2}}^-$ (lux.sec.) |
|---|---|---|---|---|
| (2) | 520 | 3.5 | 510 | 7.4 |
| (3) | 480 | 4.8 | 465 | 9.8 |
| (4) | 505 | 2.8 | 510 | 6.4 |
| (5) | 535 | 6.3 | 520 | 13.6 |
| (8) | 490 | 3.0 | 475 | 6.2 |
| (9) | 465 | 4.5 | 450 | 10.0 |
| (10) | 615 | 5.0 | 615 | 11.5 |
| (12) | 495 | 5.6 | 480 | 12.0 |

In the Table, $V_0^+$ and $V_0^-$ mean the charging potentials in volts at cc electric current value of $+50$ $\mu$A and $-51$ $\mu$A, respectively. The half value exposure ($E_{\frac{1}{2}}$) is the value (in lux. sec.) upon exposure to light of 10 lux from a tungsten lamp. The film thickness was about 10$\mu$ in all cases.

EXAMPLE 12

Cyanine Pigment (6) having a particle size of 0.5$\mu$ was placed in a test tube together with steel balls and THF and powdered for 3 hours using a SPEX MILL. After completion of the pulverizing, 20% by weight of the pigment was added to and mixed with a binder, Du Pont Mylar 49000, dissolved in THF. The mixture was applied using an applicator onto an Al plate on which a polyvinylcarbazole layer (with a thickness of about 1$\mu$) had been previously formed thereon, and dried at 70° C. for 60 min. The electrical characteristics of the resulting photosensitive medium were measured in the same manner as in Example 1. The results of the measurement are shown in Table 2 below in comparison with a photosensitive medium in which no polyvinylcarbazole (PVK) layer was present.

TABLE 2

| Photosensitive Medium | $V_0^+$ (volts) | $E_{\frac{1}{2}}^{\pm}$ |
|---|---|---|
| Example 12 | 850 | 1.5 |
| Example 12 but without a PVK Layer | 525 | 1.8 |

The film thickness was about 10$\mu$ in both cases.

EXAMPLE 13

Cyanine Pigment (6) having a particle size of 0.5$\mu$ was pulverized in the same manner as in Example 12 and admixed with, as a binder (Du Pont Mylar 49000), in an amount of 60% by weight on a total weight basis. The mixture was applied onto an Al plate such that the film thickness (dry) was about 1$\mu$. Then, polyvinylcarbazole was applied onto the layer using a bar coater so that a total film thickness (dry) reached about 10$\mu$, followed by drying at 70° C. for 60 min. The electrical characteristics of the resulting photosensitive medium were measured in the same manner as in Example 1. As a result, the half value exposure in negative charging was found to be 1.0 lux. sec.

EXAMPLE 14

Cyanine Pigment (7) having a particle size of 0.3$\mu$ was used to make a photosensitive medium in the same manner as in Example 13. The photosensitive medium had a half value exposure of 1.2 lux. sec in negative charging.

EXAMPLE 15

Cyanine Pigment (11) was pulverized in the same manner as in Example 12, and was admixed with polyvinylcarbazole which had been dissolved in THF and added with 0.05 wt.% of Methylene Blue, in an amount of 20% by weight on a total weight basis. The mixture was applied onto an Al plate using an applicator and dried at 70° C. for 5 hours. The resulting photosensitive medium had a half value exposure of 9 lux. sec under conditions of positive charging.

While the invention has been described in detail and with reference to specific embodiments thereof, it will be apparent to one skilled in the art that various changes and modifications can be made therein without departing from the spirit and scope thereof.

What is claimed is:

1. A photosensitive medium for electrography which comprises an electrically conductive support having thereon a photoconductive layer consisting essentially of a non-photoconductive binder and a cyanine pigment which functions as a photoconductor and which comprises particles having a size below about 5 microns but larger than molecular size expressed by the following general formula (I)

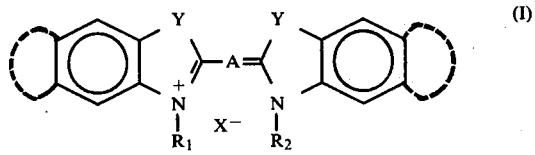

in which A represents

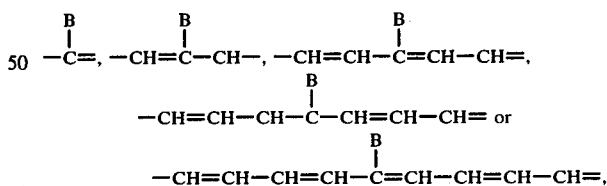

wherein B represents an aromatic group, a halogen atom, a nitro group, a cyano group, an acetoxy group, a styryl group, an alkylthio group, an alkoxy group,

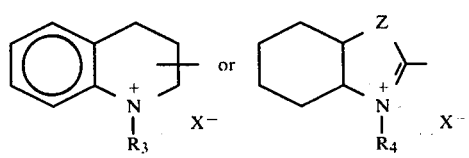

in which Z represents —O—, —Se—,

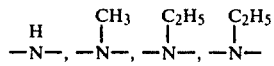

or —S—, $R_1$, $R_2$, $R_3$ and $R_4$, which may be the same or different, each represents an alkyl group or an allyl group, Y represents —S—, —Se—, —O—,

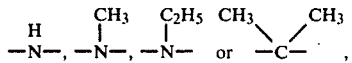

X represents an anion, and the moiety ◯ in the above formula (I) can optionally represents a benzene ring fused to the terminal benzene ring.

2. The photosensitive medium of claim 1, wherein said photoconductive layer comprises a charge-generating layer and a charge-transporting layer, both of which contains said cyanine pigment expressed by the general formula (I).

3. The photosensitive medium of claim 1, wherein said cyanine pigment particles are dispersed in an electrically insulating resin.

4. The photosensitive medium as claimed in claim 3, wherein said cyanine pigment is present in said electrically insulating resin in an amount of about 5 to 90% by weight thereof.

5. The photosensitive medium of claim 1, wherein said cyanine pigment particles are dispersed in a binder which is photoconductive.

6. The photosensitive medium of claim 1, wherein said cyanine pigment particles are dispersed in a binder which is non-photoconductive.

7. The photosensitive medium of claim 4, wherein said amount is 10 to 60% by weight thereof.

8. The photosensitive medium of claim 1, which exhibits a wide spectral sensitivity over the wavelength of visible light of about 4,000 to about 7,000 A.